Figure 1:
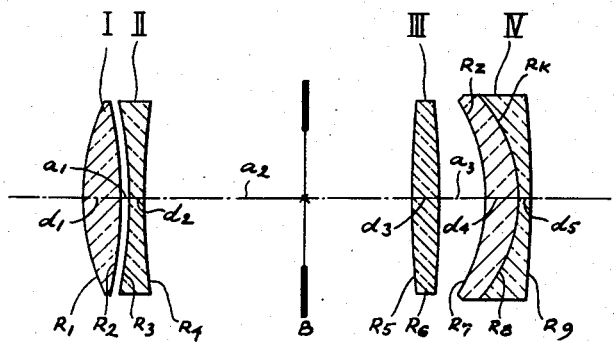

Dec. 15, 1953  A. W. TRONNIER  2,662,446
PHOTOGRAPHIC TELEOBJECTIVE HAVING A COMPOSITE
POSITIVE FRONT PART AXIALLY SPACED FROM
A COMPOSITE NEGATIVE REAR PART
Filed Dec. 13, 1951

INVENTOR.
ALBRECHT WILHELM TRONNIER
BY Mock + Blum
ATTORNEYS

Patented Dec. 15, 1953

2,662,446

UNITED STATES PATENT OFFICE 2,662,446

PHOTOGRAPHIC TELEOBJECTIVE HAVING A COMPOSITE POSITIVE FRONT PART AXIALLY SPACED FROM A COMPOSITE NEGATIVE REAR PART

Albrecht Wilhelm Tronnier, Gottingen, Germany, assignor to Voigtlander A. G., Braunschweig, Germany, a corporation of Germany Application December 13, 1951, Serial No. 261,505

6 Claims. (Cl. 88—57)

This invention relates to a photographic objective of the teleobjective type, in which the intersectional width on the image side, for the remote object, is smaller than the half of the equivalent focal length of the objective.

The main object of the present invention is to provide a photographic tele-system objective of new design, having an increased telephoto-effect in comparison with known tele-objectives.

Another object of the present invention is to provide an objective of the before mentioned type, distinguished by correction with particularly small zonal aberrations in and outside of the axis.

Further objects and the advantages of the invention will be apparent from the appended claims and drawings and the following specification which describes by way of example and without limitation some embodiments of the invention.

Teleobjectives known from the art consist of a composite front lens member which is turned toward the major conjugate, has a positive total refractive power and is separated by a wide airspace from a likewise composite rear lens member arranged on the side of the minor conjugate and having a diverging total refractive power, the diaphragm of the objective being arranged, in general, in said air-space. The telephotoeffect of known objectives, measured by the reciprocal value of the ratio between the resulting paraxial intersectional width and the total focal length, amounts to about 2.0, in the known telephoto objectives.

The known objectives of the above mentioned type, comprise, in general, front members which, in the manner of objectives of the Fraunhofertype, are composed of a biconvex converging lens and a subsequent diverging lens of unequal curvature, while the diverging rear member, which follows the converging front member in the meaning of the photographic picture, mostly belongs to the Gauss type, and the rear member lens turned toward the diaphragm space consists of a strongly diverging meniscus, and is directly followed by a converging lens of unequal curvature, which limits the total objective on the side of the minor conjugate.

It has been suggested previously to improve the performance of known tele-objectives by dividing one or more of the above described elements or substituting cemented lens groups for the latter, but these suggestions were not successful. Furthermore, attempts were made to attain the desired improvements by the use of very strongly curved surfaces, particularly very strongly curved cemented surfaces. These attempts gave also no satisfactory results, because very strongly curved surfaces always cause essential disadvantages, particularly in widely open lenses.

According to the new principle of my present invention, tele-objectives of particularly improved photographic performance are obtained in the following manner.

The front part of objectives embodying my present invention, consists of a lens group (I, II) of the Fraunhofer design, having converging effect, and the rear part of the objectives consists of a diverging lens group (III, IV) which is likewise of the Fraunhofer type. The wide airspace between the front part and rear part of the objective, is limited, on the side of the minor conjugate, by a biconvex converging lens III, which is followed by a diverging lens IV of unequal curvature. This lens IV has a strongly diverging concave surface, having a radius of curvature $R_z$, turned toward said biconvex converging lens III, said surface being thus concave relative to light incident in the meaning of the photographic picture.

By the application of this new principle, teleobjectives can be obtained, the telephoto-effect of which is distinctly higher than 2.50.

It has been further found that in the new objectives embodying the present invention, a correction with particularly small zonal aberrations in and outside of the axis, can be obtained by selecting said radius of curvature $R_z$ of the above mentioned concave surface of negative lens (IV) in such manner that it amounts to at least 20% and to not more than 60% of radius of curvature $R_3$ of the front surface, which is concave toward the side of the major conjugate, of diverging lens of unequal curvature II of the front part of the objective.

It has been also found that said characteristic concave surface having the radius of curvature $R_z$, of lens IV, should be arranged at such distance from the converging front member and the distance, measured on the optical axis, between the vertex of said concave surface (having the radius of curvature $R_z=R_7$) and the vertex of the last surface of the front lens group, in the direction of the light, which limits the wide intermediate air space and has a radius of curvature denoted $R_4$, should be selected in such manner that the length of said radius of curvature $R_7$ amounts to 25–75% of said distance.

I have found that the beneficial effect of introducing, according to the present invention, objectives of the Fraunhofer type as the rear member in tele-objectives, in which a biconvex converging front lens III is inserted in the path of rays between the place of the diaphragm and the characteristic diverging surface having the radius of curvature $R_z$, can be still further increased. This can be attained by selecting the distance between the vertex of the front surface, having the radius of curvature $R_5$, of the biconvex converging lens III, and the vertex of the concave surface having the radius of curvature $R_7$, in such manner that said distance amounts to 20–60% of the length of said radius of curvature.

In order to obtain certain specific corrections, individual elements of the objectives embodying the present invention may consist of cemented lenses. For example, in order to obtain particularly fine correction of the astigmatic difference of adjustment (i. e. variation of the axis point image upon variation of the aperture), a cemented surface which is convex toward the diaphragm and has a distinct converging effect has been repeatedly used, in other objective types, in a lens member following the diaphragm. This means can be successfully used also in tele-objectives according to the present invention. The use of such additional correcting means for improving the photographic image, is particularly useful if it is desired to provide the tele-systems with comparatively high relative apertures, without simultaneous reduction of the useful image field.

The focal lengths of the lens elements forming the objectives according to the invention and the curvatures of the individual lens surfaces, meet the following conditions:

$0.20\ F < +f_I < 0.40\ F$
$0.30\ F < -f_{II} < 0.60\ F$
$0.60\ F < +f_{III} < 1.20\ F$
$0.30\ F < -f_{IV} < 0.60\ F$
$0.18\ F < +R_1 < 0.36\ F$
$0.30\ F < -R_2 < 0.90\ F$
$0.30\ F < -R_3 < 0.90\ F$
$0.5\ F < +R_4 < 2\ F$
$0.5\ F < +R_5 < 2\ F$
$0.5\ F < \pm R_6 < \infty$
$0.10\ F < R_z = -R_7 < 0.28\ F$
$0.25\ F < R_K = +R_8 < 1.25\ F$
$F < \pm R_9 < \infty$ wherein $f_I$, $f_{II}$, $f_{III}$, $f_{IV}$, stand for the focal lengths, in the direction of light, of the first and second lens of the composite front part, of the biconvex converging lens, and the diverging lens of unequal curvature of the rear part, respectively, of the objective, $R_1$, $R_2$, $R_3$ ... $R_8$, stand for the radii of curvature of the successive individual lens surfaces, in the direction of light, $R_K$ stands for a cemented surface of said diverging lens of the rear part and F denotes the equivalent focal length of the total objective.

Figure 2:
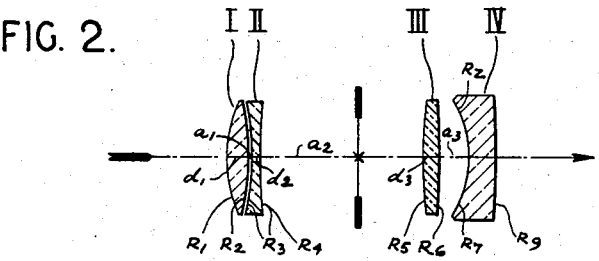
Figure 3:
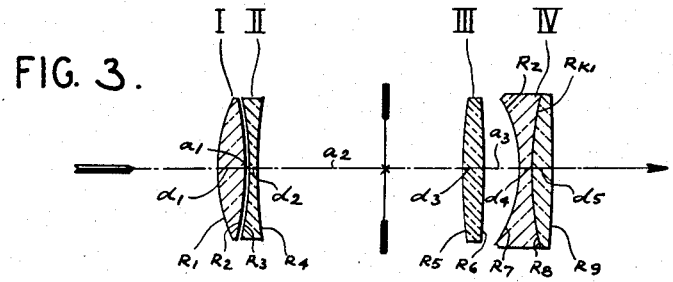

The appended drawings illustrate some embodiments of the invention in vertical section taken along the optical axis. The reference symbols used are best shown in Figure 1, in which lens IV contains a cemented concave surface $R_K$. Figure 2 diagrammatically illustrates an embodiment of the invention in the case of an equivalent focal length of f=150 mm., in natural size, having a relative aperture of 1:6.8. Figure 3 illustrates an embodiment of higher light-transmitting capacity.

In the drawings, the diaphragm is denoted by reference symbol B, and the lens members arranged on both sides of the diaphragm are denoted I, II and III, IV, respectively. The radii of curvature (R), the thicknesses of lenses (d) and the axial air distances (a), are consecutively numbered from the side of the major conjugate to the side of the minor conjugate. The glasses of the lenses forming the objective are characterized by their mean refraction numbers ($n_d$), referring to the yellow spectral line of helium light, and in connection with their color dispersion by the Abbe numbers ($\nu$), likewise consecutively numbered in the beforementioned manner.

In the embodiment of higher light-transmitting capacity, shown in Figure 3, negative lens member IV, which is located on the side of the minor conjugate, contains a distinctly converging cemented surface $R_{K'}$, which is convex relative to the diaphragm. The focal length, on which this figure is based, is likewise 150 mm. and yields a system of high light-transmitting capacity, the aperture of which is 1:5.4 and the structure of which is proportional to the numerical example which follows here further below.

The data of the following table are based on a focal length of 1, and the radii of curvatures, the thickness of the lenses and air distances, measured along the optical axis, are stated in the same unit. The effective aperture amounts to 0.185. The paraxial intersectional width of the objective is denoted $p_0'$. The telephoto-effect amounts to 2.615.

Numerical example

[f=1.0   1:5.4   $p_0'$=0.38247]

| | | | |
|---|---|---|---|
| $R_1 = +0.24249$ | $d_1 = 0.03716$ | $n_1 = 1.5836$ | $\nu_1 = 46.2$ |
| $R_2 = -0.46572$ | $a_1 = 0.00117$ | air | |
| $R_3 = -0.46572$ | $d_2 = 0.01395$ | $n_2 = 1.72755$ | $\nu_2 = 28.4$ |
| $R_4 = +0.95587$ | $a_2 = 0.27242$ | diaphragm space | |
| $R_5 = +0.95587$ | $d_3 = 0.02906$ | $n_3 = 1.62355$ | $\nu_3 = 47.0$ |
| $R_6 = -1.20345$ | $a_3 = 0.04413$ | air | |
| $R_z = R_7 = -0.17794$ | $d_4 = 0.01741$ | $n_4 = 1.58264$ | $\nu_4 = 42.1$ |
| $R_K = R_8 = +0.41341$ | $d_5 = 0.03098$ | $n_5 = 1.75512$ | $\nu_5 = 27.0$ |
| $R_9 = -2.05432$ | | | |

$R_2$ and $R_3$ are equal in the above example, and the calculation is based on a relatively very small distance of the surfaces having radii $R_2$ and $R_3$, in order to indicate that this converging front member of the Fraunhofer type can be cemented at said surfaces, if desired.

According to the above example, $R_7 = R_z = 0.17794$ and $R_3 = 0.46572$
20% of $R_3 = 0.093144$
60% of $R_3 = 0.279432$ Thus, the absolute value of $R_z = 0.17794$ is in the range between the above limit values of 0.093144 and 0.279432.

The distance between the vertex of the last lens surface (having the radius of curvature $R_4$) of the front part of the objective, in the direction of light, and the vertex of the concave surface, having radius of curvature $R_z$, of the rear part of the objective, amounts to $a_2 = 0.27242$
$d_3 = 0.02906$
$a_3 = 0.04413$ $a_2 + d_3 + a_3 = 0.34561$ 25% of 0.34561 = 0.0864025
75% of 0.34561 = 0.2592075

The absolute value of $R_z=0.17794$ is also in the range of these limit values 0.0864025 and 0.2592075.

Furthermore, the distance between the front surface, having radius of curvature $R_5$, of the rear part of the objective, and the vertex of the subsequent, diverging concave surface having radius of curvature $R_7=R_z$, amounts to $$d_3=0.02906$$
$$a_3=0.04413$$
$$\overline{d_3+a_3=0.07319}$$

20% of $(R_z=0.17794)=0.035588$
60% of $(R_z=0.17794)=0.106764$

Thus, said sum 0.07319 is in the range between said limit values 0.035588 and 0.106764.

It will be understood that this invention is not limited to the materials, curvatures, distances and other details specifically disclosed above and illustrated in the drawings and can be carried out with various modifications without departing from the scope of the invention as defined in the appended claims.

What I claim is:

1. Photographic tele-system objective, comprising a composite front part of positive total refractive power turned toward the side of the major conjugate, said front part being separated by a wide air space from a likewise composite rear part having a total diverging power and being arranged on the side of the minor conjugate, said composite front part being of the Fraunhofer type and consisting of a biconvex converging lens and a diverging lens of unequal curvature, following said biconvex lens in the direction of light, said composite rear part being likewise of the Fraunhofer type, the air space between said front part and rear part being limited, on the side of the minor conjugate by a biconvex converging lens followed, in the direction of light, by a diverging lens of unequal curvature, the latter having a strongly diverging concave surface turned toward said biconvex converging lens, the lens elements of the objective meeting the condition of $R_z$ being in the range between $$\frac{20}{100} \cdot R_3 \text{ and } \frac{60}{100} \cdot R_3$$

wherein $R_z$ is the length of radius of curvature of said strongly diverging concave surface, and $R_3$ is the length of the radius of curvature of the front surface, which is concave toward the side of the major conjugate of said diverging lens of unequal curvature, of the front part of the objective.

2. Photographic tele-system objective, comprising a composite front part of positive total refractive power turned toward the side of the major conjugate, said front part being separated by a wide air space from a likewise composite rear part having a total diverging power and being arranged on the side of the minor conjugate, said composite front part being of the Fraunhofer type and consisting of a biconvex converging lens and a diverging lens of unequal curvature, following said biconvex lens in the direction of light, said composite rear part being likewise of the Fraunhofer type, the air space between said front part and rear part being limited, on the side of the minor conjugate by a biconvex converging lens followed, in the direction of light, by a diverging lens of unequal curvature, the latter having a strongly diverging concave surface turned toward said biconvex converging lens, the lens elements of the objective and their arrangement meeting the conditions of $R_z$ being in the range between $$\frac{20}{100} \cdot R_3 \text{ and } \frac{60}{100} \cdot R_3$$

wherein $R_z$ is the length of radius of curvature of said strongly diverging concave surface, and $R_3$ is the length of the radius of curvature of the front surface, which is concave toward the side of the major conjugate of said diverging lens of unequal curvature, of the front part of the objective, and $R_z$ being in the range between $$\frac{25}{100} \cdot D_1 \text{ and } \frac{75}{100} \cdot D_1$$

wherein $D_1$ denotes the distance between the vertex of said strongly diverging concave surface and the vertex of the rear surface, in the direction of light, of said diverging lens of unequal curvature, of the front part of the objective, said distance being measured along the optical axis of the objective.

3. Photographic tele-system objective, comprising a composite front part of positive total refractive power turned toward the side of the major conjugate, said front part being separated by a wide air space from a likewise composite rear part having a total diverging power and being arranged on the side of the minor conjugate, said composite front part being of the Fraunhofer type and consisting of a biconvex converging lens and a diverging lens of unequal curvature, following said biconvex lens in the direction of light, said composite rear part being likewise of the Fraunhofer type, the air space between said front part and rear part being limited, on the side of the minor conjugate by a biconvex converging lens followed, in the direction of light, by a diverging lens of unequal curvature, the latter having a strongly diverging concave surface turned toward said biconvex converging lens, the lens elements of the objective and their arrangement meeting the conditions of $R_z$ being in the range between $$\frac{20}{100} \cdot R_3 \text{ and } \frac{60}{100} \cdot R_3$$

wherein $R_z$ is the length of radius of curvature of said strongly diverging concave surface, and $R_3$ is the length of the radius of curvature of the front surface, which is concave toward the side of the major conjugate of said diverging lens of unequal curvature, of the front part of the objective, and $R_z$ being in the range between $$\frac{25}{100} \cdot D_1 \text{ and } \frac{75}{100} \cdot D_1$$

wherein $D_1$ denotes the distance between the vertex of said strongly diverging concave surface and the vertex of the rear surface, in the direction of light, of said diverging lens of unequal curvature, of the front part of the objective, said distance being measured along the optical axis of the objective, and $D_2$ being in the range of $$\frac{20}{100} \cdot R_z \text{ and } \frac{60}{100} \cdot R_z$$

wherein $D_2$ denotes the distance between the vertex of the front surface, in the meaning of the light, of the biconvex converging lens of the rear part of the objective, and the vertex of said strongly diverging concave surface of the diverging lens of unequal curvature, of the rear part of the objective.

4. An objective as claimed in claim 3, in which at least one lens member consists of cemented lens elements.

5. An objective as claimed in claim 3, in which the diverging lens of unequal curvature of the rear part of the objective, contains a cemented surface, which is convex relative of the diaphragm.

6. Photographic tele-system objective, comprising a composite front part of positive total refractive power turned toward the side of the major conjugate, said front part being separated by a wide air space from a likewise composite rear part having a total diverging power and being arranged on the side of the minor conjugate, said composite front part being of the Fraunhofer type and said composite rear part being likewise of the Fraunhofer type, the air space between said front part and rear part being limited, on the side of the minor conjugate by a biconvex converging lens followed, in the direction of light, by a diverging lens of unequal curvature, the latter having a strongly diverging concave surface turned toward said biconvex converging lens; the focal lengths of the lens elements forming the objective and the curvatures of the lens surfaces meeting the following conditions:

$0.20\ F < +f_I < 0.40\ F$
$0.30\ F < -f_{II} < 0.60\ F$
$0.60\ F < +f_{III} < 1.20\ F$
$0.30\ F < -f_{IV} < 0.60\ F$
$0.18\ F < +R_1 < 0.36\ F$
$0.30\ F < -R_2 < 0.90\ F$
$0.30\ F < -R_3 < 0.90\ F$
$0.5\ \ F < +R_4 < 2\ F$
$0.5\ \ F < +R_5 < 2\ F$
$0.5\ \ F < \pm R_6 < \infty$
$0.10\ F < R_Z = -R_7 < 0.28\ F$
$0.25\ F < R_K = +R_8 < 1.25\ F$
$F < \pm R_9 < \infty$ wherein $f_I$, $f_{II}$, $f_{III}$, $f_{IV}$, stand for the focal lengths, in the direction of light, of the first and second lens of the composite front part, of the biconvex converging lens, and the diverging lens of unequal curvature of the rear part, respectively, of the objective, $R_1$, $R_2$, $R_3$ . . . $R_9$, stand for the radii of curvature of the successive individual lens surfaces, in the direction of light, $R_K$ stands for a cemented surface of said diverging lens of the rear part and F denotes the equivalent focal length of the total objective.

ALBRECHT WILHELM TRONNIER.

References Cited in the file of this patent
UNITED STATES PATENTS

| Number | Name | Date |
|---|---|---|
| 560,460 | Aldis | May 19, 1896 |
| 2,380,207 | Aklin | July 10, 1945 |
| 2,541,485 | Schade et al. | Feb. 13, 1951 |
| 2,576,436 | Baker | Nov. 27, 1951 |

FOREIGN PATENTS

| Number | Country | Date |
|---|---|---|
| 222,709 | Great Britain | Oct. 9, 1924 |
| 471,565 | Germany | Feb. 15, 1929 |